(12) United States Patent
Johnson

(10) Patent No.: US 6,487,812 B2
(45) Date of Patent: Dec. 3, 2002

(54) REMOTE FISH BITE INDICATOR

(76) Inventor: Jason J. Johnson, 3940 Glendale Dr., Excelsior, MN (US) 55331

( * ) Notice: Subject to any disclaimer, the term of this patent is extended or adjusted under 35 U.S.C. 154(b) by 25 days.

(21) Appl. No.: 09/727,410

(22) Filed: Dec. 1, 2000

(65) Prior Publication Data

US 2002/0066221 A1 Jun. 6, 2002

(51) Int. Cl.[7] .............................................. A01K 97/12
(52) U.S. Cl. ........................................................ 43/17
(58) Field of Search ............................................. 43/17

(56) References Cited

U.S. PATENT DOCUMENTS

| | | | |
|---|---|---|---|
| 3,835,462 A | | 9/1974 | Periman |
| 4,437,255 A | * | 3/1984 | Reed .............................. 43/17 |
| 4,528,554 A | | 7/1985 | Klefbeck |
| D282,273 S | * | 1/1986 | Eli ................................ D22/23 |
| 4,780,979 A | * | 11/1988 | Dyck et al. ..................... 43/17 |
| 4,980,986 A | * | 1/1991 | Harper .......................... 43/17 |
| 4,996,788 A | | 3/1991 | Wieting et al. |
| D317,195 S | * | 5/1991 | Hackel ....................... D22/134 |
| 5,097,618 A | | 3/1992 | Stoffel |
| D326,136 S | | 5/1992 | Hochstetler et al. |
| 5,235,773 A | * | 8/1993 | Rinehart ........................ 43/17 |
| 5,321,391 A | * | 6/1994 | Fox ............................. 340/573 |
| 5,396,726 A | | 3/1995 | Zepeda, Sr. |
| D377,079 S | * | 12/1996 | Robinson .................... D22/137 |
| 6,011,477 A | * | 1/2000 | Teodorescu et al. ..... 340/573.1 |
| 6,088,945 A | * | 6/2000 | Sanderfoot ....................... 43/4 |

FOREIGN PATENT DOCUMENTS

| | | | | |
|---|---|---|---|---|
| GB | 2093671 A | * | 2/1981 | .......... A01K/97/12 |
| SU | 1398789 A | * | 5/1988 | .......... A01K/87/00 |

* cited by examiner

*Primary Examiner*—Peter M. Poon
*Assistant Examiner*—Bethany L. Griles

(57) ABSTRACT

A remote fish bite indicator for eliminating the need for the user to continually watch the tip-ups to know when a fish is biting. The remote fish bite indicator includes a housing; and also includes a spool assembly including brackets being securely attached to the housing, and also including a spool and a fishing line being carried by the spool and having a fish hook at an end thereof; and further includes a motion detector being attached to the housing for detecting tampering and moving of the housing; and also includes a line tension sensor also being attached to the housing for detecting amount of tension being applied to the fishing line; and also includes a transmitter assembly including a transmitter being mounted to the housing and being connected to the motion detector and to the line tension sensor for sending out signals upon a fish biting said fishing line and upon the housing being tampered with; and further includes a remote receiver unit being adapted to be carried by a user and capable of receiving signals from the transmitter.

18 Claims, 3 Drawing Sheets

REMOTE FISH BITE INDICATOR

BACKGROUND OF THE INVENTION

1. Field of the Invention

The present invention relates to a fish bite detector and more particularly pertains to a new remote fish bite indicator for eliminating the need for the user to continually watch the tip-ups to know when a fish is biting.

2. Description of the Prior Art

The use of a fish bite detector is known in the prior art. More specifically, a fish bite detector heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,835,462; 5,396,726; 5,097,618; 4,996,788; U.S. Patent No. Des. 326,136; and U.S. Pat. No. 4,528,554.

While these devices fulfill their respective, particular objectives and requirements, the aforementioned patents do not disclose a new remote fish bite indicator. The inventive device includes a housing; and also includes a spool assembly including brackets being securely attached to the housing, and also including a spool and a fishing line being carried by the spool and having a fish hook at an end thereof; and further includes a motion detector being attached to the housing for detecting tampering and moving of the housing; and also includes a line tension sensor also being attached to the housing for detecting amount of tension being applied to the fishing line; and also includes a transmitter assembly including a transmitter being mounted to the housing and being connected to the motion detector and to the line tension sensor for sending out signals upon a fish biting said fishing line and upon the housing being tampered with; and further includes a remote receiver unit being adapted to be carried by a user and capable of receiving signals from the transmitter.

In these respects, the remote fish bite indicator according to the present invention substantially departs from the conventional concepts and designs of the prior art, and in so doing provides an apparatus primarily developed for the purpose of eliminating the need for the user to continually watch the tip-ups to know when a fish is biting.

SUMMARY OF THE INVENTION

In view of the foregoing disadvantages inherent in the known types of fish bite detector now present in the prior art, the present invention provides a new remote fish bite indicator construction wherein the same can be utilized for eliminating the need for the user to continually watch the tip-ups to know when a fish is biting.

The general purpose of the present invention, which will be described subsequently in greater detail, is to provide a new remote fish bite indicator which has many of the advantages of the fish bite detector mentioned heretofore and many novel features that result in a new remote fish bite indicator which is not anticipated, rendered obvious, suggested, or even implied by any of the prior art fish bite detector, either alone or in any combination thereof.

To attain this, the present invention generally comprises a housing; and also includes a spool assembly including brackets being securely attached to the housing, and also including a spool and a fishing line being carried by the spool and having a fish hook at an end thereof; and further includes a motion detector being attached to the housing for detecting tampering and moving of the housing; and also includes a line tension sensor also being attached to the housing for detecting amount of tension being applied to the fishing line; and also includes a transmitter assembly including a transmitter being mounted to the housing and being connected to the motion detector and to the line tension sensor for sending out signals upon a fish biting said fishing line and upon the housing being tampered with; and further includes a remote receiver unit being adapted to be carried by a user and capable of receiving signals from the transmitter.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new remote fish bite indicator which has many of the advantages of the fish bite detector mentioned heretofore and many novel features that result in a new remote fish bite indicator which is not anticipated, rendered obvious, suggested, or even implied by any of the prior art fish bite detector, either alone or in any combination thereof.

It is another object of the present invention to provide a new remote fish bite indicator which may be easily and efficiently manufactured and marketed.

It is a further object of the present invention to provide a new remote fish bite indicator which is of a durable and reliable construction.

An even further object of the present invention is to provide a new remote fish bite indicator which is susceptible of a low cost of manufacture with regard to both materials and labor, and which accordingly is then susceptible of low prices of sale to the consuming public, thereby making such remote fish bite indicator economically available to the buying public.

Still yet another object of the present invention is to provide a new remote fish bite indicator which provides in the apparatuses and methods of the prior art some of the advantages thereof, while simultaneously overcoming some of the disadvantages normally associated therewith.

Still another object of the present invention is to provide a new remote fish bite indicator for eliminating the need for the user to continually watch the tip-ups to know when a fish is biting.

Yet another object of the present invention is to provide a new remote fish bite indicator which includes a housing; and also includes a spool assembly including brackets being securely attached to the housing, and also including a spool and a fishing line being carried by the spool and having a fish hook at an end thereof; and further includes a motion detector being attached to the housing for detecting tampering and moving of the housing; and also includes a line tension sensor also being attached to the housing for detecting amount of tension being applied to the fishing line; and also includes a transmitter assembly including a transmitter being mounted to the housing and being connected to the motion detector and to the line tension sensor for sending out signals upon a fish biting said fishing line and upon the housing being tampered with; and further includes a remote receiver unit being adapted to be carried by a user and capable of receiving signals from the transmitter.

Still yet another object of the present invention is to provide a new remote fish bite indicator that allows the user to quickly hurry over to the fishing line to set the fishing hook in the fish.

Even still another object of the present invention is to provide a new remote fish bite indicator that is easy and convenient to use and allows the user to do other things rather than just sitting and watching all his tip-ups.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
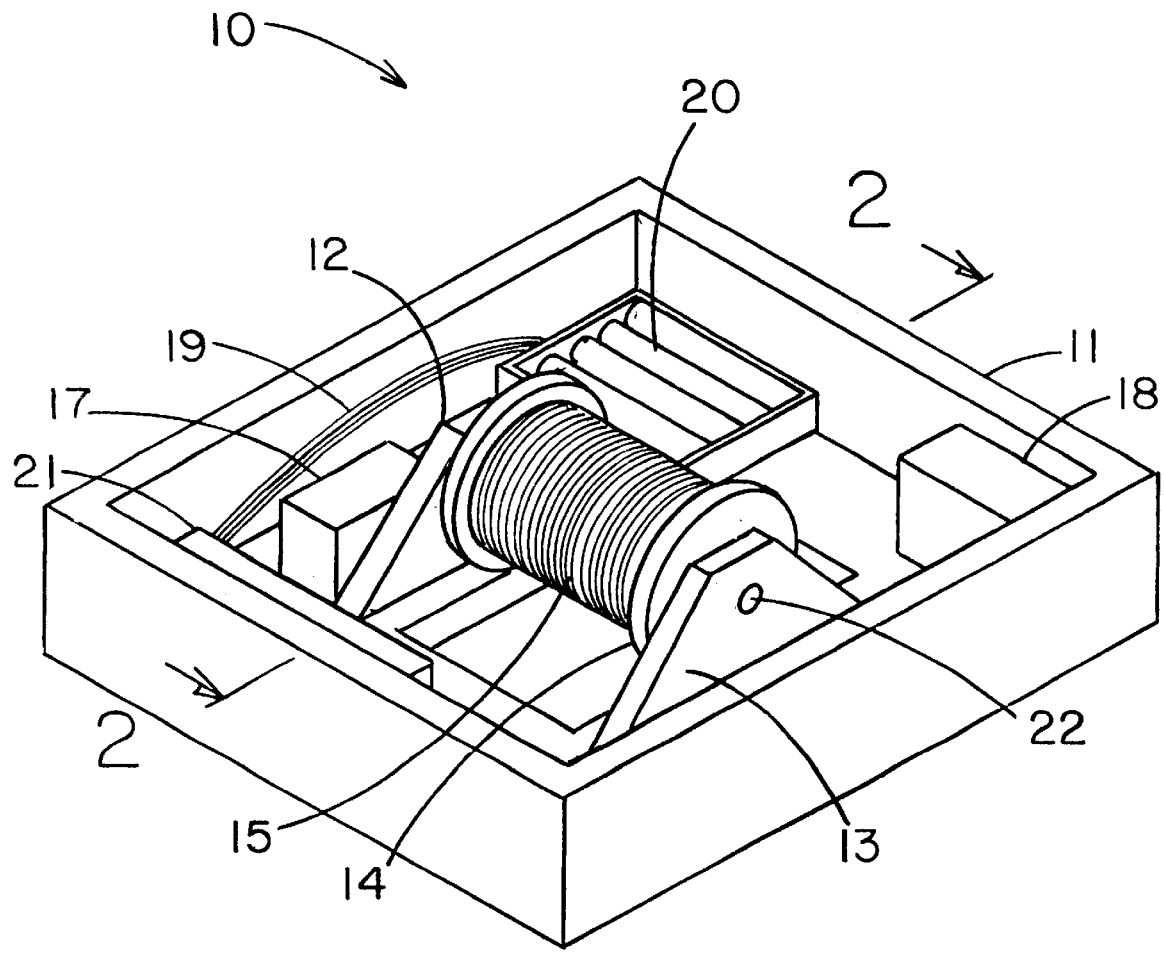
FIG. 1 is a perspective view of a new remote fish bite indicator according to the present invention.
Figure 2:
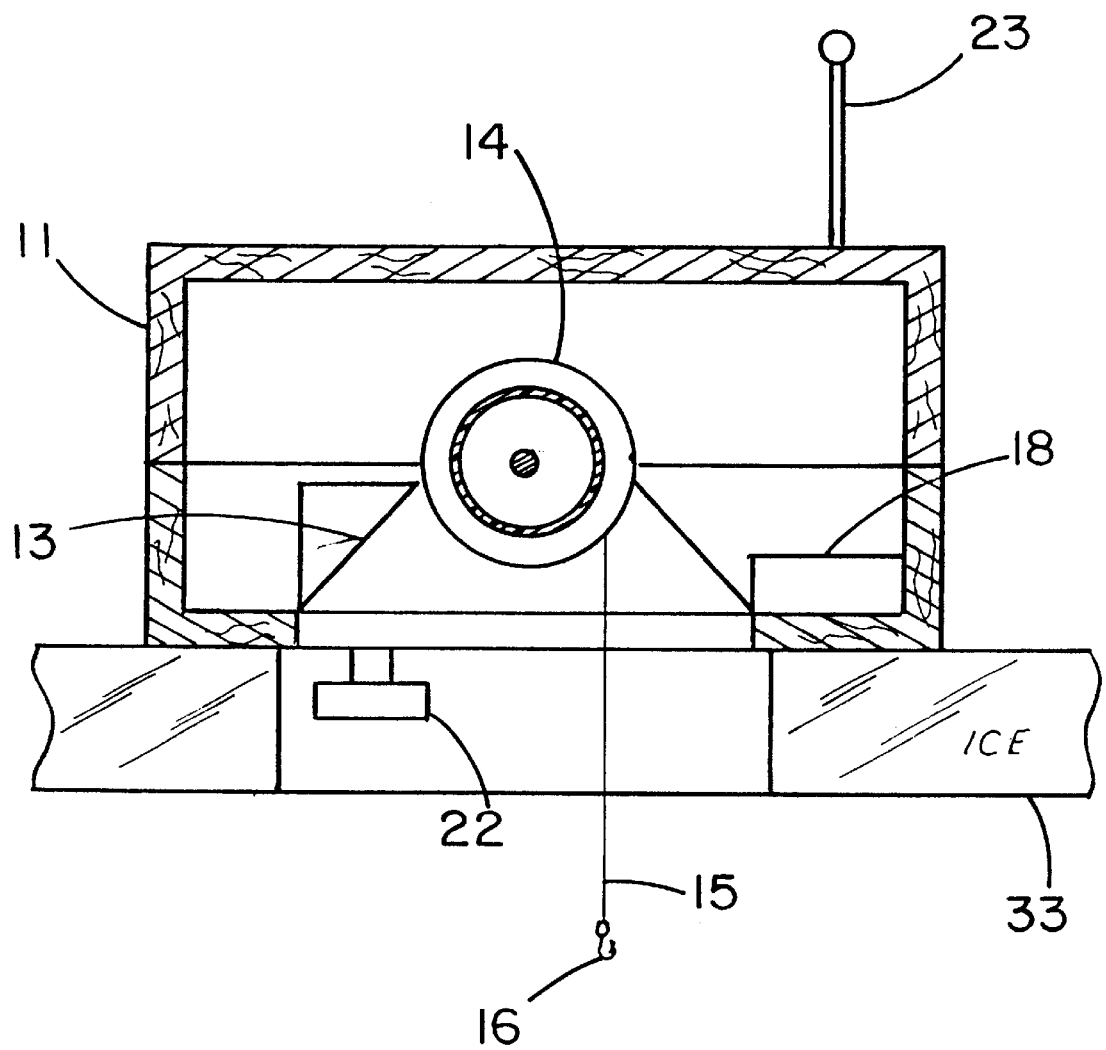
FIG. 2 is a cross-sectional view of the present invention.
Figure 3:
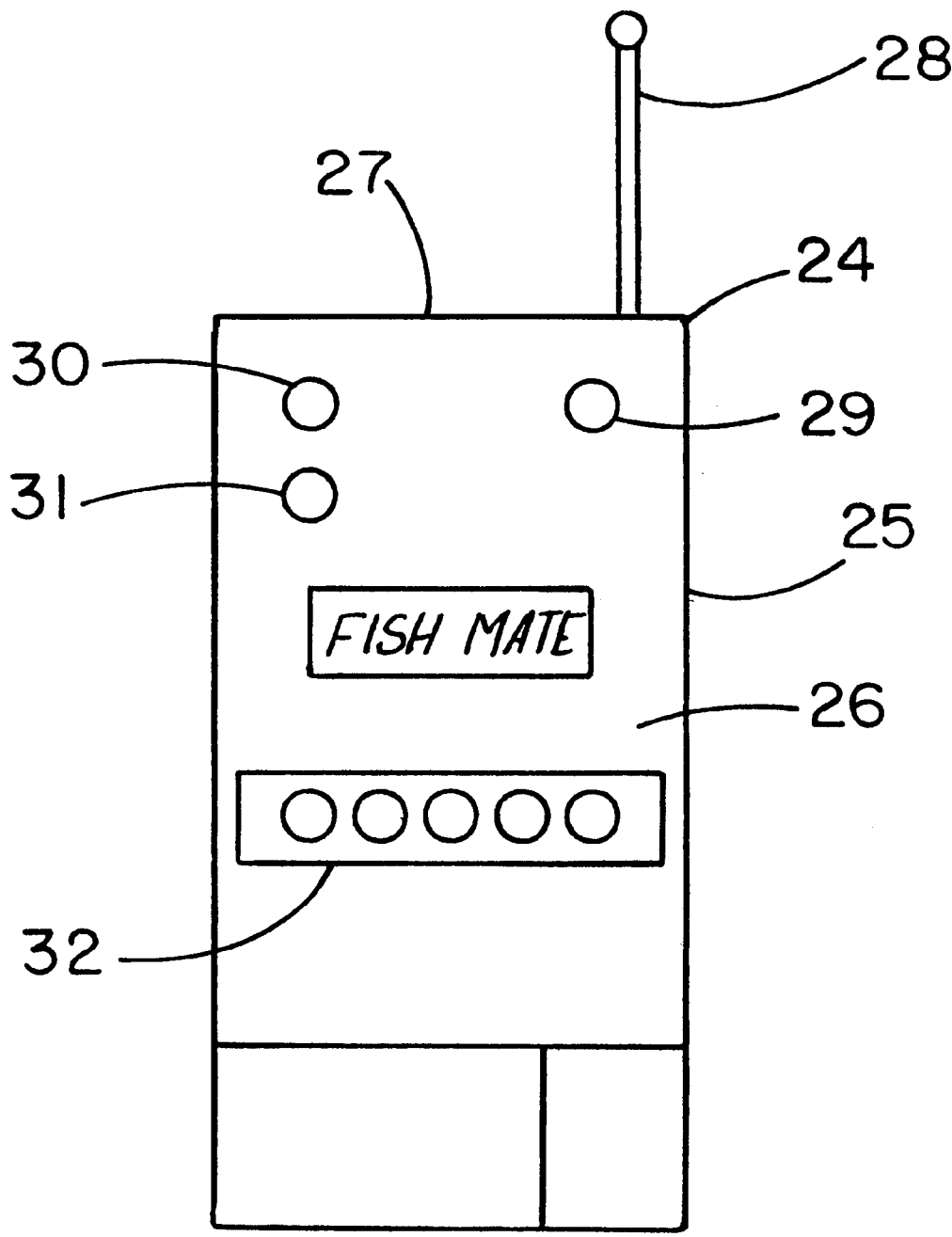
FIG. 3 is a top plan view of the remote receiver unit of the present invention.

With reference now to the drawings, and in particular to FIGS. 1 through 3 thereof, a new remote fish bite indicator embodying the principles and concepts of the present invention and generally designated by the reference numeral 10 will be described.

As best illustrated in FIGS. 1 through 3, the remote fish bite indicator 10 generally comprises a housing 11 having side walls and being adapted to rest upon ice over a hole in the ice. A spool assembly includes bracket members 12,13 being securely and conventionally attached to the housing 11, and also includes a spool 14 being conventionally mounted to the bracket members 12,13, and further includes a fishing line 15 being carried by the spool 14 and having a fish hook 16 at an end thereof.

A motion detector 17 is conventionally attached to the housing 11 for detecting tampering and moving of the housing 11. A line tension sensor 18 is also conventionally attached to the housing for detecting amount of tension being applied to the fishing line 15 by a fish. A transmitter assembly includes a transmitter 21 being conventionally mounted to the housing 11 and being connected to the motion detector 17 and to the line tension sensor 18 for sending out signals upon a fish biting the fishing line 15 and upon the housing 11 being tampered with. The transmitter assembly further includes an antenna 23 being securely and conventionally attached to the housing 11 and being conventionally connected to the transmitter 21, and also includes a battery pack 20 being securely and conventionally mounted to the housing 11 and being connected with wires 19 to the transmitter 21, and further includes a trip switch member 22 which is conventionally attached to the spool 14 and which is connected to the transmitter 21 with wires 19. The transmitter 21 also is connected with wires 19 to the line tension sensor 18 and to the motion detector 17.

A remote receiver unit 24 is adapted to be carried by a user and capable of receiving signals from the transmitter 21. The transmitter 21 includes a circuit board which is capable of determining what type of signal to send to the remote receiver unit 24. The remote receiver unit 24 includes a hand-held housing member 25 having a front wall 26 and a top wall 27, and also includes an antenna 28 being securely and conventionally disposed in the top wall 30 thereof, and further includes light-emitting members 29–32 being conventionally disposed in the front wall 26 thereof for notifying the user of a fish bite. The light-emitting members 29–32 includes a power light-emitting member 29 for indicating whether the remote receiver unit 24 is on or off, and further includes a motion detector light-emitting member 30 which will illuminate upon the housing 11 being tampered with or moved, and also includes a fish bite light-emitting member 31 which will illuminate upon a fish biting the fishing hook 16, and further includes line tension light-emitting members 32 which will illuminate upon an amount of tension being put upon the fishing line 15 by the fish.

In use, the user sets the housing upon the ice over a hole in the ice and extends the fishing line 15 and the fishing hook 16 into the water through the hole and turns the power on to the transmitter 21 and to the remote receiver unit 24. Upon a fish biting the fishing hook 16, the trip switch member 22 sends a signal to the transmitter 21 which sends a signal to the remote receiver unit 24. Also, the amount of tension being put upon the fishing line 15 by the fish will also be sent to the remote receiver unit 24 by the transmitter 21 and which will register as to which of the light-emitting members of the line tension light-emitting members 32 is illuminated. Further, if the housing 11 is moved or tampered with, the motion detector 17 will send a signal to the transmitter 21 which, in turn, will send a signal to the remote receiver unit 24.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A remote fish bite indicator comprising:
   a housing being adapted to rest upon ice and over a hole in the ice;
   a spool assembly including bracket members attached to said housing, a spool being mounted to said bracket members, and a fishing line being carried by said spool and having a fish hook attached at an end of said fishing line;
   a motion detector being attached to said housing for detecting movement of said housing;
   a line tension sensor being attached to said housing for detecting an amount of tension being applied to said fishing line;
   a transmitter assembly including a transmitter being mounted to said housing and being connected to said motion detector and to said line tension sensor for sending out signals upon detection by said line tension sensor of a fish biting said fishing line by said line tension sensor and upon detection by said motion detector of said housing being moved; and
   a remote receiver unit being adapted to be carried by a user and capable of receiving signals from said transmitter.

2. A remote fish bite indicator comprising:
   a housing having side walls and being adapted to rest upon ice and over a hole in the ice;
   a spool assembly including bracket members being securely attached to said housing, and also including a spool being mounted to said bracket members, and further including a fishing line being carried by said spool and having a fish hook at an end thereof;
   a motion detector being attached to said housing for detecting tampering and moving of said housing;
   a line tension sensor also being attached to said housing for detecting an amount of tension being applied to said fishing line;
   a transmitter assembly including a transmitter being mounted to said housing and being connected to said motion detector and to said line tension sensor for sending out signals upon a fish biting said fishing line and upon said housing being tampered with; and
   a remote receiver unit being adapted to be carried by a user and capable of receiving signals from said transmitter;
   wherein said transmitter assembly further includes an antenna being securely attached to said housing and being connected to said transmitter, and also includes a battery pack being securely mounted to said housing and being connected with wires to said transmitter, and further includes a trip switch member which is attached to said spool and which is connected to said transmitter with wires, said transmitter also being connected with wires to said line tension sensor and to said motion detector.

3. A remote fish bite indicator as described in claim 2, wherein said transmitter includes a circuit board which is capable of determining what type of signal to send to said remote receiver unit.

4. A remote fish bite indicator as described in claim 2, wherein said remote receiver unit includes a hand-held housing member having a front wall and a top wall, and also includes an antenna being disposed in said top wall thereof, and further includes light-emitting members being disposed in said front wall thereof for notifying the user of a fish bite.

5. A remote fish bite indicator as described in claim 4, wherein said light-emitting members include a power light-emitting member for indicating whether said remote receiver unit is on or off, and further include a motion detector light-emitting member which will illuminate upon said housing being tampered with or moved, and also include a fish bite light-emitting member which will illuminate upon a fish biting said fishing hook, and further include line tension light-emitting members which will illuminate upon the amount of tension being put upon said fishing line by the fish.

6. A remote fish bite indicator comprising:
   a housing having side walls and being adapted to rest upon ice and over a hole in the ice;
   a spool assembly including bracket members being securely attached to said housing, and also including a spool being mounted to said bracket members, and further including a fishing line being carried by said spool and having a fish hook at an end thereof;
   a motion detector being attached to said housing for detecting tampering and moving of said housing;
   a line tension sensor also being attached to said housing for detecting amount of tension being applied to said fishing line;
   a transmitter assembly including a transmitter being mounted to said housing and being connected to said motion detector and to said line tension sensor for sending out signals upon a fish biting said fishing line and upon said housing being tampered with, said transmitter assembly further including an antenna being securely attached to said housing and being connected to said transmitter, and also including a battery pack being securely mounted to said housing and being connected with wires to said transmitter, and further including a trip switch which is attached to said spool and which is connected to said transmitter with wires, said transmitter also being connected with wires to said line tension sensor and to said motion detector; and
   a remote receiver unit being adapted to be carried by a user and capable of receiving signals from said transmitter, said transmitter including a circuit board which is capable of determining what type of signal to send to said remote receiver unit, said remote receiver unit including a hand-held housing member having a front wall and a top wall, and also including an antenna being securely disposed in said top wall thereof, and further including light-emitting members being disposed in said front wall thereof for notifying the user of a fish bite, said light-emitting members including a power light-emitting member for indicating whether said remote receiver unit is on or off, and further including a motion detector light-emitting member which will illuminate upon said housing being tampered with or moved, and also including a fish bite light-emitting member which will illuminate upon a fish biting said fishing hook, and further including line tension light-emitting members which will illuminate upon the amount of tension being put upon said fishing line by the fish.

7. A remote fish bite indicator as described in claim 1, wherein said transmitter includes circuitry capable of determining what type of signal to send to said remote receiver unit.

8. A remote fish bite indicator as described in claim 1, wherein said remote receiver unit includes a housing member.

9. A remote fish bite indicator as described in claim 1. wherein said remote receiver unit includes an antenna disposed on said housing.

10. A remote fish bite indicator as described in claim 1, wherein said remote receiver unit includes light-emitting members being disposed on said housing for notifying the user of a fish bite.

11. A remote fish bite indicator as described in claim 10, wherein said light-emitting members include a power light-emitting member for indicating whether said remote receiver unit is on or off.

12. A remote fish bite indicator as described in claim 10, wherein said light-emitting members include a motion detector light-emitting member for illuminating upon said housing being moved.

13. A remote fish bite indicator as described in claim 10, wherein said light-emitting members include a fish bite light-emitting member for illuminating upon a fish biting said fishing hook.

14. A remote fish bite indicator as described in claim 10, wherein said light-emitting members include line tension light-emitting members for indicating an amount of tension being put upon said fishing line by the fish.

15. A remote fish bite indicator as described in claim 1, wherein said transmitter is operatively connected to said line tension sensor and to said motion detector.

16. A remote fish bite indicator as described in claim 15, wherein said transmitter assembly includes a trip switch member attached to said spool and connected to said transmitter.

17. A remote fish bite indicator as described in claim 16, wherein said transmitter assembly includes an antenna attached to said housing and connected to said transmitter.

18. A remote fish bite indicator as described in claim 17, wherein said transmitter assembly includes a battery pack mounted to said housing and being connected to said transmitter.

* * * * *